US012157258B2

(12) United States Patent
Asakura (10) Patent No.: US 12,157,258 B2
(45) Date of Patent: Dec. 3, 2024

(54) MOLDED PRODUCT TAKE-OUT APPARATUS

(71) Applicant: KABUSHIKI KAISHA HARMO, Nagano (JP)

(72) Inventor: Toshifumi Asakura, Nagano (JP)

(73) Assignee: KABUSHIKI KAISHA HARMO, Nagano (JP)

( * ) Notice: Subject to any disclaimer, the term of this patent is extended or adjusted under 35 U.S.C. 154(b) by 191 days.

(21) Appl. No.: 17/911,546

(22) PCT Filed: Jul. 29, 2021

(86) PCT No.: PCT/JP2021/028005
§ 371 (c)(1),
(2) Date: Sep. 14, 2022

(87) PCT Pub. No.: WO2022/044681
PCT Pub. Date: Mar. 3, 2022

(65) Prior Publication Data
US 2023/0148322 A1    May 11, 2023

(30) Foreign Application Priority Data

Aug. 25, 2020  (JP) ................................. 2020-141424
Sep. 18, 2020  (JP) ................................. 2020-157585
Sep. 28, 2020  (JP) ................................. 2020-161931

(51) Int. Cl.
*B29C 45/78*    (2006.01)
*B29B 13/06*    (2006.01)
(Continued)

(52) U.S. Cl.
CPC ........ *B29C 45/7626* (2013.01); *B29B 13/065* (2013.01); *B29C 45/42* (2013.01);
(Continued)

(58) Field of Classification Search
CPC ............ B29C 45/78; B29C 2045/7633; B29C 2045/7626; B29C 2945/76531;
(Continued)

(56) References Cited

U.S. PATENT DOCUMENTS 7,517,206 B2 *   4/2009  Nishizawa .............. B29C 45/76
                                                     425/149
2002/0031567 A1 *  3/2002  Magario ................. B29C 45/76
                                                     425/135
(Continued)

FOREIGN PATENT DOCUMENTS

EP          3888877 B1 *  12/2022  ............. B29C 45/17
JP          H06-114906 A    4/1994
(Continued)

OTHER PUBLICATIONS

PCT/ISA/210, "International Search Report for PCT International Application No. PCT/JP2021/028005," Oct. 5, 2021.

*Primary Examiner* — Atul P. Khare
(74) *Attorney, Agent, or Firm* — HAUPTMAN HAM, LLP (57) ABSTRACT

A molded product take-out apparatus includes: a controller independent of a molding machine; a take-out robot for releases a molded product from a mold in the molding machine by a command from the controller; a temperature controller regulates the temperature of the mold; a material dryer dries material to be supplied to the molding machine; and a material conveyor supplies the dried material to the molding machine. The controller is network-connected to the take-out robot and the temperature controller and the material dryer and the material conveyor. The controller is configured to control a release operation of the take-out robot to differentiate a release place between when judging that a detection data to be within an allowable range and another case.

2 Claims, 7 Drawing Sheets

(51) Int. Cl.
*B29C 45/42* (2006.01)
*B29C 45/76* (2006.01)

(52) U.S. Cl.
CPC ...... *B29C 45/78* (2013.01); *B29C 2045/7633* (2013.01); *B29C 2945/76066* (2013.01); *B29C 2945/76531* (2013.01); *B29C 2945/76565* (2013.01); *B29C 2945/76625* (2013.01); *B29C 2945/76795* (2013.01); *B29C 2945/76899* (2013.01); *G05B 2219/45244* (2013.01)

(58) Field of Classification Search
CPC ........... B29C 2945/76795; B29C 2945/76899; B29C 2945/76066; B29C 2945/76565; B29C 2945/76625

See application file for complete search history.

(56) References Cited

U.S. PATENT DOCUMENTS

| | | | | |
|---|---|---|---|---|
| 2019/0377309 A1* | 12/2019 | Chen | ...................... | G05B 15/02 |
| 2020/0307054 A1* | 10/2020 | Tanaka | .................. | B29C 45/766 |
| 2022/0134622 A1* | 5/2022 | Tsukada | ................. | B29C 45/76 |
| | | | | 264/40.1 |

FOREIGN PATENT DOCUMENTS

| | | | | | |
|---|---|---|---|---|---|
| JP | H0649310 | B2 | * | 6/1994 | ............. B29C 45/76 |
| JP | 2530546 | B2 | * | 9/1996 | |
| JP | 2001-088188 | A | | 4/2001 | |
| JP | 3320362 | B2 | * | 9/2002 | |
| JP | 2003-053805 | A | | 2/2003 | |
| JP | 2003-236900 | A | | 8/2003 | |
| JP | 2006-168066 | A | | 6/2006 | |
| JP | 2016083778 | A | * | 5/2016 | |
| JP | 2018-015938 | A | | 2/2018 | |
| JP | 2020-131629 | A | | 8/2020 | |
| JP | 2021037772 | A | * | 3/2021 | |
| WO | WO-2022201993 | A1 | * | 9/2022 | |

* cited by examiner

MOLDED PRODUCT TAKE-OUT APPARATUS

RELATED APPLICATIONS

The present application is National Phase of International Application No. PCT/JP2021/028005 filed Jul. 29, 2021, and claims priority from Japanese Applications No. 2020-141424, filed Aug. 25, 2020; No. 2020-157585, filed Sep. 18, 2020; and No. 2020-161931, filed Sep. 28, 2020, the disclosures of which are hereby incorporated by reference herein in its entirety.

TECHNICAL FIELD

The present invention relates to a molded product take-out apparatus.

BACKGROUND ART

An injection molding machine (hereinafter abbreviated as molding machine) is an apparatus that repeats a molding cycle for injecting a heated and melted material into a mold and cooling and solidifying the material and produces a molded product. The molding machine can mass-produce a molded product having a complicated shape in a short time. Kinds of peripheral equipment such as a molded product take-out apparatus, temperature controller, material dryer, and material conveyor are arranged in the molding machine.

There has been proposed a molding station management system including a terminal apparatus that sends and receives management information of a molding machine and peripheral equipment to and from a host management computer (PTL 1: JP-A-2001-088188). There has been proposed a molding machine including a molded product take-out machine that transfers, with transfer part, take-out data input from a setting device provided in a control unit of the molding machine to a control unit of the molded product take-out machine, stores the take-out data in a work memory, performs movement control for a chuck device based on the take-out data read from the work memory, and executes a take-out operation (PTL 2: JP-A-2003-053805). There has been proposed a measurement apparatus including an input section to which a detection signal from a sensor arranged in a molding machine is input, an evaluation-value calculating section that performs calculation of an evaluation value using a detection signal value input to the input section in a designated period in a molding cycle, and a judgment processing section that calculates a judgment result of an injection molding state using the evaluation value calculated by the evaluation-value calculating section (PTL 3: JP-A-2018-015938).

CITATION LIST

Patent Literature

PTL 1: JP-A-2001-088188
PTL 2: JP-A-2003-053805
PTL 3: JP-A-2018-015938

SUMMARY OF INVENTION

Technical Problem

However, in PTL 1 and PTL 2, since the control circuit of the molding machine and the management computer of the molding machine are configured to manage peripheral equipment, a load on the molding machine side is large. In PTL 3, since the measurement apparatus is configured to calculate a judgment result of the injection molding state, it is not assumed that the measurement apparatus manages peripheral equipment. That is, the molding machines and the peripheral equipment have different communication protocols. Centralized management of a control system is substantially difficult. Enormous time and cost are required for network construction for centralized management of the control system. As a result, there is a problem in that network construction is insufficient and execution of classification control for a molded product is difficult.

Solution to Problem

The present invention has been devised in view of the above circumstances and an object of the present invention is to provide a molded product take-out apparatus having a configuration that, since a controller configured to control peripheral equipment separated from a molding machine unitarily controls a control system of the peripheral equipment, can prevent a human error and perform classification control for a molded product without applying a load to the molding machine.

The present invention has been accomplished under the solutions as disclosed below.

A molded product take-out apparatus according to the present invention includes: a controller is configured to control following parts of peripheral equipment separated from a molding machine, and including an input/output section to which an operator can input production start time and a reference timer indicating present time; a take-out robot including an effector for a take out and a release operation of a molded product from a mold in the molding machine by a command from the controller; a material dryer configured to dry a material for supplied to the molding machine and started at a first timer value of a first timer; a temperature controller regulating the temperature of the mold and started at a second timer value of a second timer; a material conveyor supplies a reference supply amount of the dried material to a hopper of the molding machine; and the take-out robot, the temperature controller, the material dryer, the material conveyor, and the controller are network-connected, and wherein the controller is configured to send a request signal for detection data to the material dryer, receive the detection data from the material dryer, and send the command to the take-out robot and is configured to control, based on the detection data from the material dryer, the release operation of the take-out robot to differentiate a release place between when judging the detection data is within an allowable range and when judging the detection data is outside the allowable range, and the controller is configured to control, based on signals from the material dryer and the temperature controller, start operations of the material conveyor and the take-out robot.

With this configuration, according to the configuration for controlling the respective kinds of peripheral equipment in a network-connected state with the controller, it is possible to prevent a human error without applying a load to the molding machine. The take-out robot can perform a plurality of kinds of operations according to the command from the controller, timely judge a release place for the molded product, and arrange the molded product in a different place according to quality required of the molded product. That is, since the related art uses the control circuit of the molding machine and the management computer of the molding machine, the related art has to perform the centralized management of the control system while matching a communication protocol with the peripheral equipment. However, with this configuration, it is possible to perform classification control for the molded product corresponding to quality required of the molded product simply by operating a portable controller exclusive for peripheral device. Classification of the molded product is, as an example, classification of a normal product and a defective product and is, as another example, classification by ranking or classifying for the molded product. In addition, since the take-out robot starts an operation at a point in time when the material dries and a mold temperature reaches a predetermined temperature, an efficient operation can be timely performed. Further, since the material dryer and the material conveyor can be associated even in the case of a configuration in which the material dryer and the material conveyor are not directly connected by a signal, it is possible to cause the material dryer and the material conveyor to start operations in synchronization with each other.

As an example, the controller is configured to perform drying condition setting for the material dryer, temperature condition setting for the temperature controller, and operation condition setting for the take-out robot. As an example, the take-out robot changes to an automatic operation state according to the command from the controller and is unitarily managed by the controller. As an example, the operator can collectively perform the condition setting for the respective kinds of peripheral equipment with simple operation for only selecting a mold name from a setting screen of the controller. With this configuration, it is possible to prevent a human error. In addition, it is possible to perform reasonable operation control for the respective kinds of peripheral equipment by synchronizing or associating the respective kinds of peripheral equipment according to the mold name.

As an example, the controller is configured to, when the detection data from the material dryer is outside the allowable range continuously for a predetermined shot, control a stop operation for, after causing the take-out robot to release a predetermined number of the molded products in a non-normal product release place different from when judging that the detection data is within the allowable range, stopping the take-out robot, stopping conveyance of the material supplied from the material conveyor to the molding machine, and stopping the material dryer. With this configuration, when it is judged abnormal with the detection data from the material dryer, the material dryer is stopped even if the number of molded products has not reached the number of molded normal products at a point in time when a fixed number of molded products are continuously released in the non-normal product release place such as an inspection required product release place and the material conveyance to the molding machine by the material conveyor is also stopped. Therefore, it is possible to easily improve the quality of the molded product by, for example, not sending an abnormally dried material to the molding machine until a deficiency causing detection data in the material dryer is solved.

As an example, the molding machine has a mold name, an injection condition, a mold opening condition, a mold closing condition, a molding temperature condition, and other known molding conditions. The signal from the molding machine is, as an example, a mold opening signal and is, in particular, a mold opening limit signal. The detection data from the material dryer is, as an example, one or more kinds among temperature of a material, a dew point temperature of air to the material, temperature of the air to the material, a supply pressure of the air to the material, and an air quantity of the air to the material. The detection data from the temperature controller is, as an example, any one or more kinds among temperature of the mold, temperature of a medium passing an inside of the mold, and a flow rate of the medium passing the inside of the mold.

As an example, the controller and the molding machine are connected by wire and the controller, the material dryer, the material conveyor, the temperature controller, and the take-out robot are network-connected by wire. Examples of the network connection include a wired LAN, a wireless LAN, USB connection, and other known signal connection schemes. The communication protocol is generally standardized in the peripheral equipment. Note that, as a configuration other than the configuration described above, the molding machine and the controller are connected by radio in some cases and the take-out robot, the temperature controller, and the controller are network-connected by radio in other cases. A judgment standard for judging that the detection data is outside a normal range and a judgment standard for judging that the detection data is within the normal range are data-input to the controller and set in advance by an administrator in some cases and a management limit value obtained by calculation unit performing, based on a statistical method, an arithmetic operation of the detection data accumulated in a database is set as the judgment standard in other cases. The release place where the take-out robot releases the molded product corresponding to the detection data is, as an example, classified according to a material drying state division and, when a material drying state is an abnormal value, is the non-normal release place and a pertinent product is set as an inspection target according to a situation in some cases and is judged as a defective product in other cases. The release place where the take-out robot releases the molded product corresponding to the detection data is, as an example, classified according to a temperature division and, when temperature of the mold is an abnormal value, is the non-normal release place and a pertinent product is set as an inspection target according to a situation in some cases and is judged as a defective product in other cases. In this way, classification control for the molded product corresponding to quality required of the molded product can be performed.

The controller is preferably configured to, when the production start time is selected or input in the input/output section at the present time, respectively calculate the first timer value and the second timer value based on the selected or input production start time and, when judging that a calculation result is not effective, return to a state in which the production start time can be input again and, when judging that the calculation result is effective, respectively send the first timer value and the second timer value and perform startup control. With this configuration, according to the control of the controller, it is possible to respectively start the material dryer and the temperature controller while securing a time necessary for production preparation. Accordingly, it is possible to reduce a setup time for the peripheral equipment and prevent a human error. In addition, it is possible to perform more efficient startup control for the peripheral equipment and it is possible to achieve power saving of the peripheral equipment.

As an example, the controller is configured to subtract both of a material temperature rise time and a material preliminary drying time in the material dryer from the production start time to calculate the first timer value and subtract both of a mold temperature rise time and a mold preliminary heating time in the temperature controller from the production start time to calculate the second timer value and is configured to judge, only when a value obtained by subtracting the present time from the production start time is larger than both of the calculated first timer value and the calculated second timer value, that the calculation result is effective. With this configuration, only when there is no contradiction in setting of the first timer value and the second timer value, the controller proceeds to a step of respectively starting the material dryer and the temperature controller. Therefore, it is possible to make it easy to more safely and surely perform startup control.

As an example, the controller includes a database storing mold data of a plurality of the molds and effector data of a plurality of the effectors in association with each other and is configured to, when the effector is set in a setup change of the peripheral equipment, collate an effector signal from the effector set in the take-out robot and the mold data and, when judging that a collation result indicates that the effector signal and the mold data do not coincide, return to a state in which the setup change is possible and, when judging that the collation result indicates that the effector signal and the mold data coincide, proceed to a state in which the production start time can be input. With this configuration, only when a combination of the mold and the effector is correct, the controller proceeds to a step of inputting the production start time. Therefore, it is possible to make it easy to more safely and surely perform startup control.

As an example, it is preferable that the controller is configured to, when a mold number of the mold displayed on the input/output section is selected or input by the operator, display, on the input/output section, an effector number corresponding to the selected or input mold number. With this configuration, when the peripheral equipment setup change is performed, since the effector number of the take-out robot linked with the mold number is notified to the operator, it is possible to prevent a selection mistake of the effector number. The mold number specifies the mold and may be a mold name. The effector number specifies the effector and may be, as an example, a name. The controller may be configured to display, on the input/output section, a material number or a material name corresponding to the mold number. The operator and a worker are synonymous.

It is preferable that the controller is configured to perform control for calculating a number of section shots "q" for every supply interval time of the material, calculating, during a production period in the molding machine, a number of production shots "p" with which the molding machine reaches a planned number of productions, and adjusting a final supply amount supplied to the hopper such that a material remaining amount in the hopper in a final measuring operation of the molding machine is zero or smaller than the reference supply amount. With this configuration, according to the control of the controller, the number of production shots "p" with which the molding machine reaches the planned number of productions is calculated during the production period in the molding machine and the final supply amount supplied to the hopper is adjusted such that the material remaining amount in the hopper in the final measuring operation of the molding machine is zero or smaller than the reference supply amount. Therefore, it is possible to reduce a load on the operator without depending on experience of the operator and prevent a human error. In addition, it is possible to perform reasonable material supply control and achieve power saving of the peripheral equipment.

As an example, the controller is configured to perform control to, while taking into account a number of taken molds from the mold data in order to finally minimize a dried material supply amount into the hopper in the molding machine according to a production end and by checking, for each shot, a molding cycle time acquired during the production and a number of shots that release the molded product to a place other than the normal product release position during the production, grasp a number of molded products other than normal products during the production and then calculates a production end scheduled time and the number of production shots "p" until the production end and, after the present time indicated by the reference timer for each shot reaches a time obtained by subtracting the material preliminary drying time from a production end time, send the command to the material conveyor and not convey the material to the material dryer from a material tank even if a sensor in the material dryer sends a material supply signal. Consequently, it is possible to dry a necessary amount of the material with respect to a material consumption amount until the production end.

As an example, the controller is configured to perform control for adjusting the final supply amount with a number of shot at the time of adjustment "v(v=p−1)" obtained by subtracting 1 from the number of production shots "p". With this configuration, since the adjustment for reducing the material supply amount is performed in synchronization with the molding machine immediately before the production end, it is possible to make it easy to adjust the material supply amount to a necessary minimum material supply amount. Therefore, it is possible to make it easy to adjust the material remaining amount in the hopper to be zero or an amount smaller than the reference supply amount in the final measuring operation of the molding machine.

As an example, the material conveyor includes a valve for supplying the material to the hopper and is configured to receive a valve opening time value "k" sent from the controller and set an opening time of the valve. As an example, the controller is configured to perform control for starting the adjustment of the final supply amount with a number of shots at the start of adjustment "w (w=p−q−1)" obtained by subtracting the number of section shots "q" and further subtracting 1 from the number of production shots "p". With this configuration, as an example, even when the number of molded products other than normal products during the production suddenly occurs and the material consumption amount until the production end increases, it is possible to, while preventing shortage of the material, make it easy to adjust the material remaining amount in the hopper in the final measuring operation of the molding machine to be zero or an amount smaller than the reference supply amount.

As an example, the controller obtains, as data, from the network-connected material conveyor, a supply interval time "r" of the dried material supplied from the material dryer to the molding machine and a supply amount "u1" of the dried material supplied from the material dryer to the molding machine per one time, calculates the number of section shots "q" in the supply interval time "r" of the dried material supplied to the molding machine and a valve opening time in the material conveyor per one shot of the molding machine, further calculates the valve opening time value "k" such that the material supply amount "u1" changes to a supply amount "u2" of the dried material finally supplied when a predetermined time comes, and sends the valve opening time value "k" to the material conveyor. The material conveyor receives the valve opening time value "k"

and conveys the dried material to the hopper of the molding machine by the dried material supply amount "u2". The controller moves the take-out robot to the setup change position at the production end time and, thereafter, automatically stops the take-out robot and, at the same time, stops the material dryer. Therefore, the controller can prevent excess material drying for production by predicting a production end time and the number of shots until the production end while checking the number of molded products other than the number of normal products according to the number of ended productions, drying only the material by an amount necessary for the production, and reducing a conveyance amount of the dried material from a conveyance amount before a production end final shot and can prevent a material loss and reduce a setup time by minimizing a remaining amount of the dried material in the hopper in the molding machine after the production end. That is, it is possible to perform, based on a calculation result in the controller, reasonably control of an operation that associates the material dryer and the material conveyor.

As an example, the controller is configured to perform control for, when a number of cumulative shots "m" based on a number of times the take-out robot takes out normal products from the mold reaches the number of production shots "p", sending a take-out stop command to the take-out robot and stopping the take-out robot. With this configuration, it is possible to timely control a production ending operation of the take-out robot and power saving is achieved.

As an example, the controller is configured to perform control for, when a cumulative time "t3" based on the number of cumulative shots m reaches a material supply end time "t2" obtained by subtracting a preliminary drying time from a production end time "t1" based on the number of production shots "p", sending, to the material conveyor, a stop command for conveyance of the material before drying to the material dryer and stopping the material conveyor. With this configuration, it is possible to timely control a production ending operation of the material conveyor and power saving is achieved.

As an example, the controller sends a take-out stop command to the take-out robot with the number of production shots "p", and the take-out robot moves to the setup change position after an automatic cycle end and stops an automatic operation. Further, the controller is configured to, after the take-out robot stops the automatic operation, send the command to the temperature controller, cause the temperature controller to forcibly circulate a cooling medium at preset temperature lower than temperature of a medium circulating in a mold cooling conduit and in a preset cooling time, when the cooling time reaches a predetermined cooling time, send compressed air to the mold cooling conduit and forcibly discharge the cooling medium from the mold, and thereafter, stop operation of the temperature controller. According to this series of ending operation, it is possible to reduce a setup time such as a mold replacement time through risk avoidance of mold handling under a high mold temperature and mold cooling control at temperature lower than the temperature of the medium circulating during the production.

Advantageous Effects of Invention

According to the present invention, it is possible to realize a molded product take-out apparatus having a configuration that, since a controller configured to control peripheral equipment independently from a molding machine unitarily controls a control system of the peripheral equipment, can prevent a human error and perform classification control for a molded product without applying a load to the molding machine.

DESCRIPTION OF EMBODIMENTS

Figure 1:
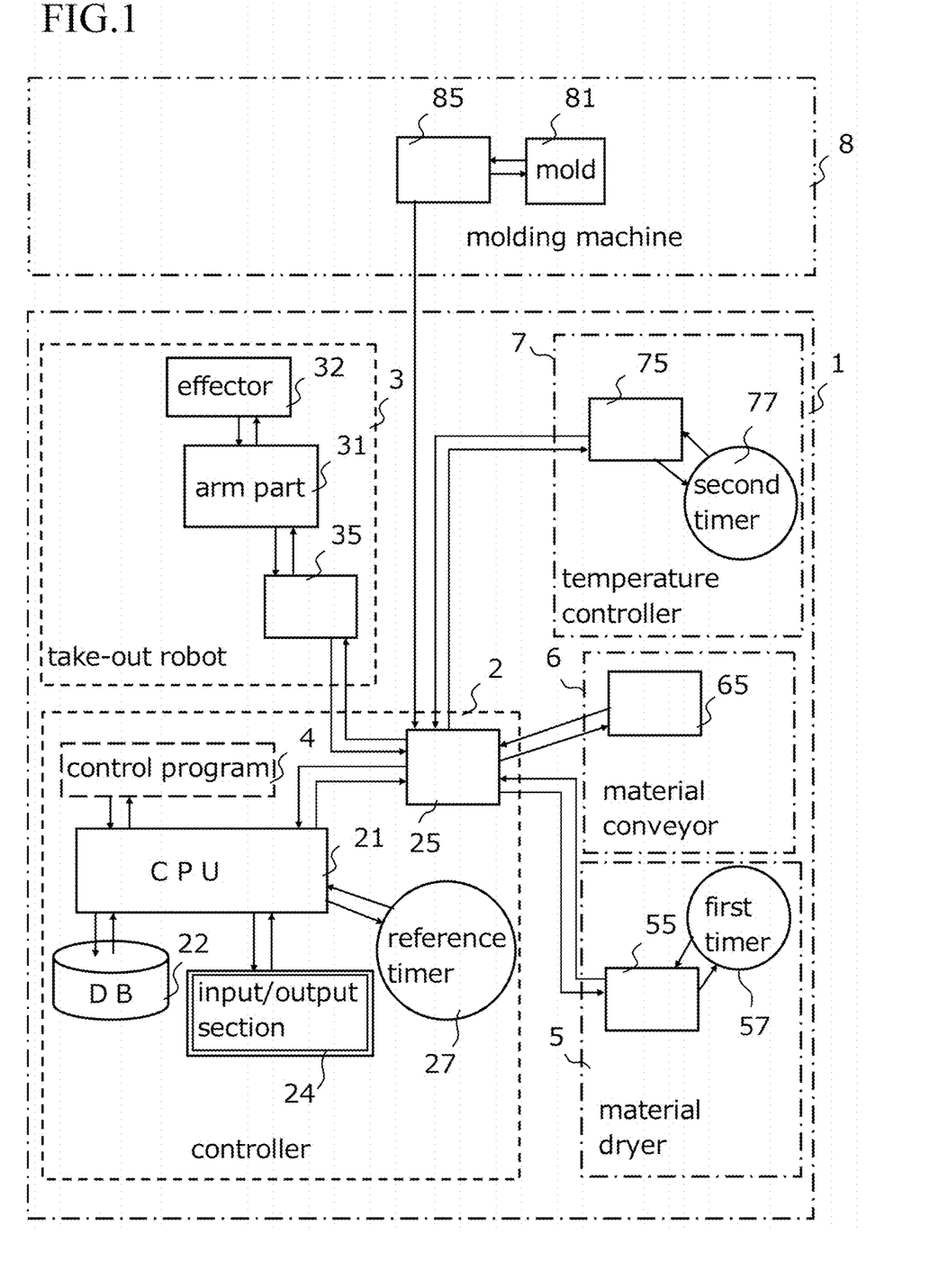
FIG. 1 is a configuration diagram schematically showing a molded product take-out apparatus according to an embodiment.
Figure 7:
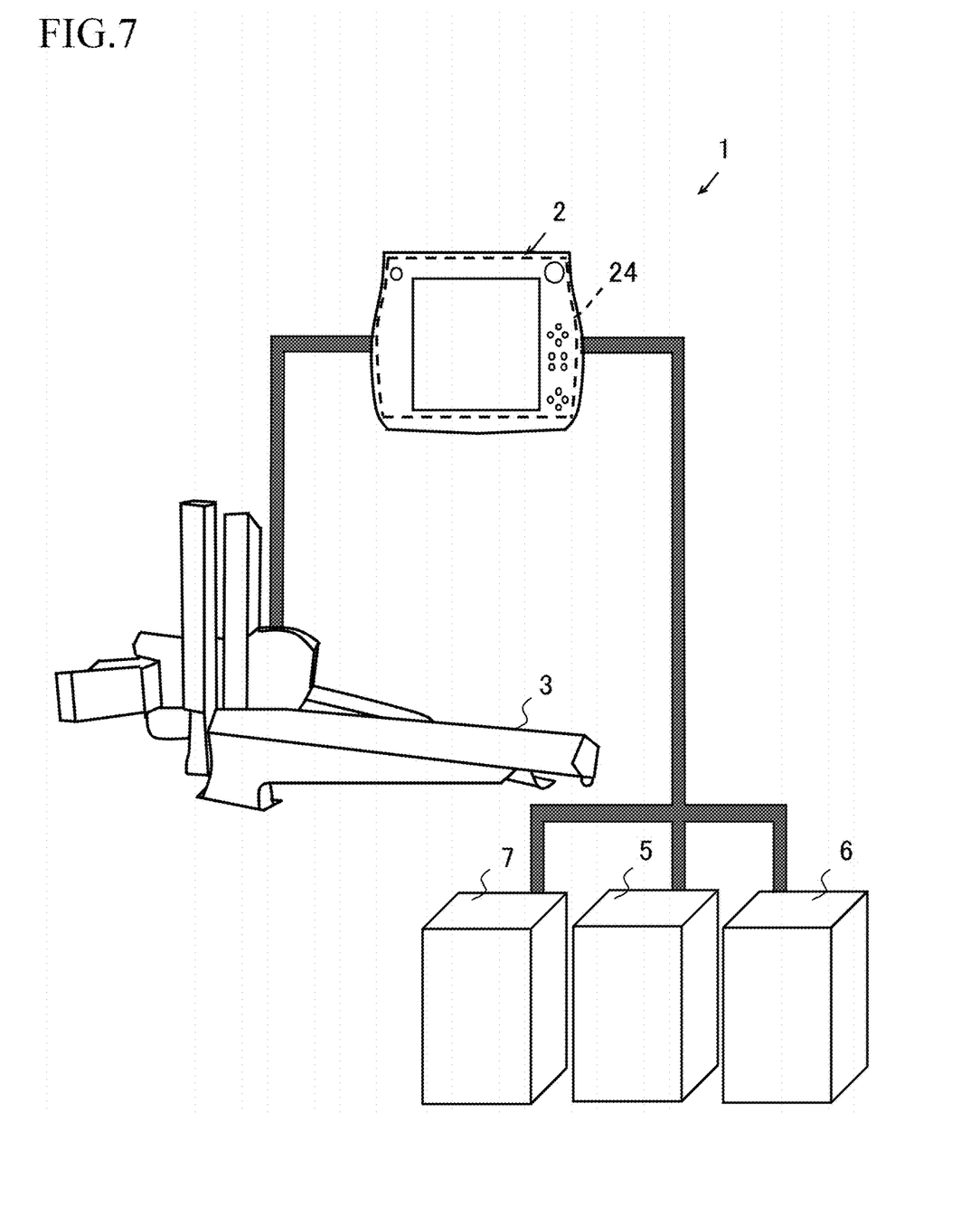
FIG. 7 is a schematic diagram showing a configuration of the molded product take-out apparatus according to the embodiment.

An embodiment of the present invention is described in detail below with reference to the drawings. As shown in FIG. 1 and FIG. 7, a molded product take-out apparatus 1 includes a controller 2 that sends the command based on detection data from material dryer 5 and sends the command based on detection data from temperature controller 7 and includes a take-out robot 3 that receives the commands, takes out a resin molded product from a mold 81, and releases the resin molded product in a predetermined place.

The controller 2 is, as an example, a terminal portable by an operator. An input/output section 24, which is a display device including buttons, a jog dial, and a touch panel, is arranged on the controller 2. A CPU 21 and a database 22, which is a secondary storage device, are incorporated in the controller 2. A control program 4 is installed in the controller 2. The controller 2 includes a reference timer 27 indicating present time and has a computer control function. The database 22 can also be stored in an external storage device (a tertiary storage device) such as a flash memory. Firmware of the control program 4 is configured by, as an example, a language such as a "C language" or "assembler", operates on an OS such as "Windows (registered trademark)" of Microsoft Corporation, and can be updated from a Web browser and the command line. Note that the firmware is not limited to the configuration described above and known firmware can be applied.

In the database 22, an operation pattern, a teaching point, operation speed, timer data, and other known operation data for each mold necessary for control of the take-out robot 3 are stored, a mold temperature, a mold preliminary heating time, and other known operation data necessary for control of the temperature controller 7 are stored, a material drying temperature, a preliminary drying time, and other known operation data necessary for control of the material dryer 5 are stored, and a conveyance time and other known operation data necessary for control of the material conveyor 6 are stored.

In the take-out robot 3, as an example, an arm part 31 is arranged by a digital servo motor. The take-out robot 3 is configured to grip, take out, and releases a molded product with an effector 32 such as a robot hand arrange on the distal end side of the arm part 31 capable of performing a seven-axis operation.

FIG. 1 is a configuration diagram schematically showing a configuration of the molded product take-out apparatus 1 according to this embodiment. A control section 25 incorporated in the controller 2 and a control section 35 incorporated in the take-out robot 3 are signal-connected. The control section 25 and a control section 55 incorporated in the material dryer 5 are signal-connected, the control section 25 and a control section 65 incorporated in the material conveyor 6 are signal-connected, and the control section 25 and a control section 75 incorporated in the temperature controller 7 are signal-connected. That is, the take-out robot 3, the material dryer 5, the material conveyor 6, the temperature controller 7, and the controller 2 are network-connected. The controller 2 is configured to receive a cycle signal "C" sent from a control section 85 incorporated in a molding machine 8 at every molding cycle and control peripheral equipment. Note that, in addition to the configuration described above, the controller 2 is sometimes configured to be capable of exchanging molded product management data and other known data using connection of the control section 25 incorporated in the controller 2 and the control section 85 incorporated in the molding machine 8.

As an example, the controller 2 collectively performs condition setting for respective kinds of peripheral equipment according to simple operation of only selecting a mold number or a mold name on a setting screen of the input/output section 24 and optionally inputting a production start time and sets timer startup time based on the present time indicated by the reference timer 27. The controller 2 performs drying condition setting for the material dryer 5, temperature condition setting for the temperature controller 7, and operation condition setting for the take-out robot 3. The take-out robot 3, the material dryer 5, and the temperature controller 7 change to an automatic operation state according to the command from the controller 2 and are unitarily managed by the controller 2. With this configuration, it is possible to prevent a human error and control a reasonable operation for the respective kinds of peripheral equipment by synchronizing or associating the respective kinds of peripheral equipment according to the mold number.

As an example, the material dryer 5 is configured to dry a granular or pellet-shaped material with circulating air via a heat exchanger. The material conveyor 6 is configured to supply the material dried by the material dryer 5 to the molding machine 8. The temperature controller 7 is configured to heat or cool the mold 81 using, as a heat medium, liquid in a pipe connected to a mold side of the molding machine 8. In addition to the configuration described above, stocker that stocks a molded product, packaging equipment that packages a molded product, and granulating equipment that granulate a sprue and a runner into a granular shape or a pellet shape are sometimes network-connected to the controller 2. With this configuration, it is possible to transfer necessary operation condition data from the controller 2 to the respective kinds of peripheral equipment and control the respective kinds of peripheral equipment relating to molding in real time. Examples of a signal connection scheme include a wired LAN, a wireless LAN, USB connection, and other known network connection.

Figure 2:
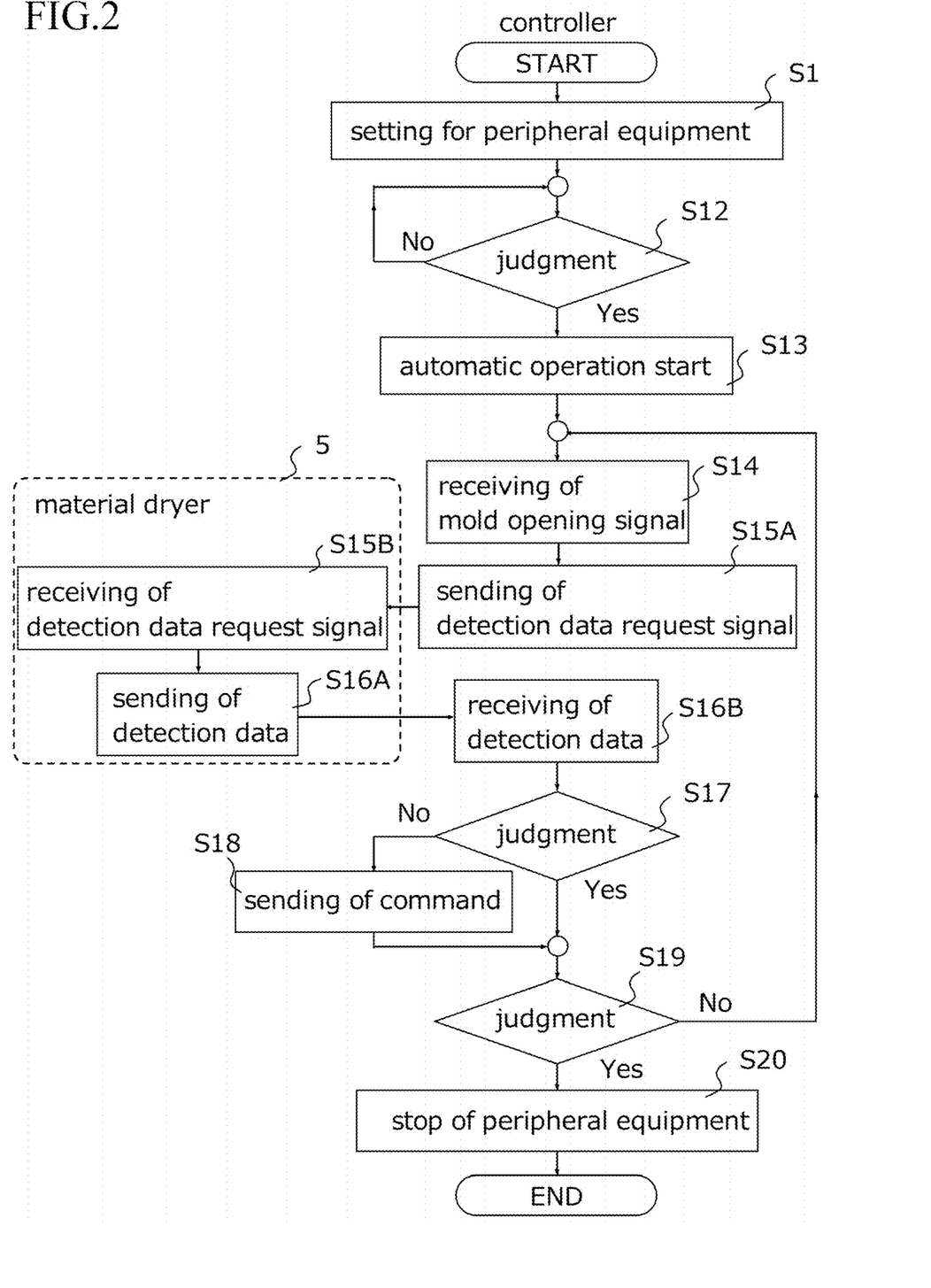
FIG. 2 is a flowchart showing an example of an operation procedure of a controller according to the embodiment.
Figure 3:
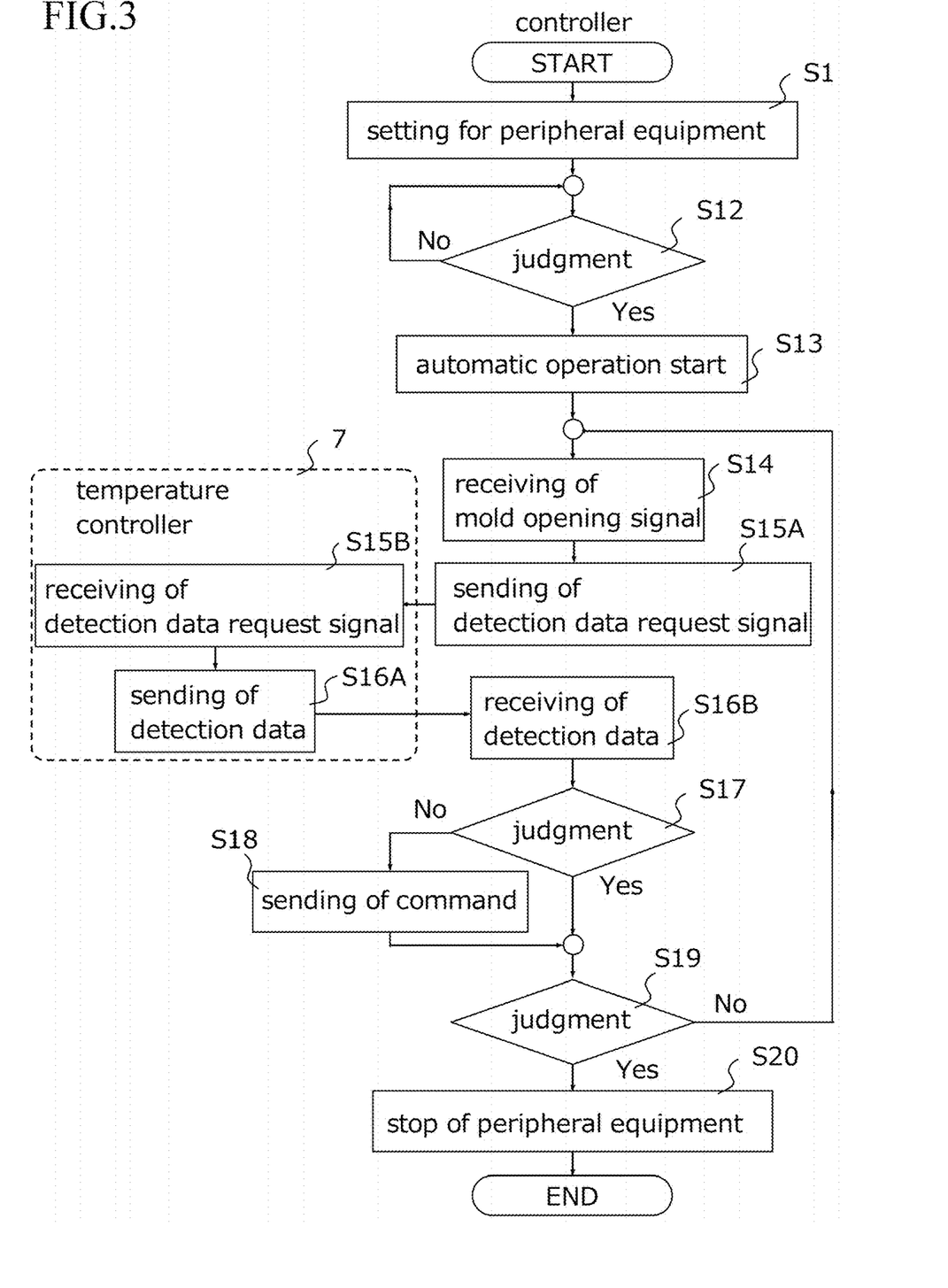
FIG. 3 is a flowchart showing an example of the operation procedure of the controller according to the embodiment.

FIG. 2 and FIG. 3 are examples of an operation procedure of the controller 2 according to this embodiment and are flowcharts including judgment to start automatic operation. Subsequently, the operation procedure of the controller 2 is described below.

As an example, in a condition setting step S1 for peripheral equipment, when an operator selects a mold name displayed on a screen in the input/output section 24 of the controller 2, the controller 2 collectively sets conditions for respective kinds of peripheral equipment such as the take-out robot 3, the material dryer 5, the material conveyor 6, and the temperature controller 7. Consequently, it is possible to prevent a selection error of mold data of the mold 81 and a condition setting error of a mold temperature and reduce a condition setting time for the respective kinds of peripheral equipment. After the condition setting step S1 for the peripheral equipment, the controller 2 proceeds to a judging step S12 for an automatic operation start.

When judging in the judging step S12 for the automatic operation start that a material drying time of a material has reached a preset material drying time and judging based on a signal from temperature detecting unit such as a temperature sensor attached to the temperature controller 7 that the mold temperature has reached a set temperature and a heating time has reached the mold preliminary heating time in a state in which the mold temperature has reached the set temperature, the controller 2 proceeds to the next automatic operation start step S13. In the automatic operation start step S13, the controller 2 sends an automatic operation start command to the take-out robot 3. The take-out robot 3 receiving the automatic operation start command from the controller 2 changes to an automatic operation mode and starts an automatic operation. Consequently, it is possible to timely perform an efficient operation. Note that, in addition to the configuration described above, in the automatic operation start step S13, the controller 2 sometimes controls an automatic operation of the respective kinds of peripheral equipment.

After the controller 2 proceeds to the automatic operation start step S13, the molding machine 8 to which the dried material is supplied by the material conveyor 6 performs a molding operation programmed in advance and produces a molded product. After the molding operation is completed or immediately before the molding operation is completed, the molding machine 8 sends a mold opening limit signal to the controller 2. The controller 2 proceeds to a mold opening signal receiving step S14 for receiving the mold opening limit signal from the molding machine 8.

[Application of Detection Data from the Material Dryer]

FIG. 2 is an example showing application of detection data from the material dryer 5. When receiving the mold opening limit signal from the molding machine 8, the controller 2 proceeds to a detection data request signal sending step S15A to the material dryer 5. In the detection data request signal sending step S15A, the controller 2 sends a detection data request signal to the material dryer 5. When the detection data request signal is sent, the material dryer 5 proceeds to a detection data request signal receiving step S15B for receiving a detection data request signal. The material dryer 5 receiving the detection data request signal proceeds to a detection data sending step S16A for sending detection data to the controller 2.

As an example, in the molding operation in the molding machine 8, the temperature detecting unit such as the temperature sensor attached to the material dryer 5 detects temperature of hot drying air in the material dryer 5 and sets the temperature as detection data. In the detection data sending step S16A, the material dryer 5 sends, to the controller 2, the detection data obtained by detecting the temperature of the hot drying air in the material dryer 5. The controller 2 proceeds to a detection data receiving step S16B for receiving the detection data. The controller 2 proceeds to a detection data judging step S17 for judging whether the received detection data is within a normal range.

[Application of Detection Data from the Temperature Controller]

FIG. 3 is an example showing application of detection data from the temperature controller 7. When receiving the mold opening limit signal from the molding machine 8, the controller 2 proceeds to the detection data request signal sending step S15A. In the detection data request signal sending step S15A, the controller 2 sends a detection data request signal to the temperature controller 7. When the detection data request signal is sent, the temperature controller 7 proceeds to the detection data request signal receiving step S15B for receiving the detection data request signal. The temperature controller 7 receiving the detection data request signal proceeds to the detection data sending step S16A for sending the detection data to the controller 2.

As an example, in the molding operation in the molding machine 8, the temperature detecting unit such as the temperature sensor attached to the temperature controller 7 detects a medium temperature in a pipe connected to the mold 81 side of the molding machine 8 and sets the medium temperature as detection data. In the detection data sending step S16A, the temperature controller 7 sends the detection data obtained by detecting the medium temperature in the pipe to the controller 2. The controller 2 proceeds to the detection data receiving step S16B for receiving the detection data. The controller 2 proceeds to the detection data judging step S17 for judging whether the received detection data is within a normal range.

When the controller 2 judges that the received detection data is within the normal range, the take-out robot 3 performs an operation for opening the molded product in a release place at a normal time or a standard time. On the other hand, when judging that the received detection data is outside the normal range, the controller 2 proceeds to the command sending step S18 for sending the command to the take-out robot 3.

In the command sending step S18, the take-out robot 3 receiving the command from the controller 2 performs a release operation for releases the molded product in a release place different from the release place at the normal time or the standard time, that is, a release place at an abnormal time or a release place at a non-normal time. The release place is classified according to division based on the detection data received by the controller 2. As an example, the release place is a defective product discharge place when the detection data received by the controller 2 is an abnormal value. With this configuration, it is possible to perform classification control for a molded product corresponding to quality required of the molded product. When the release operation in the release place at the abnormal time or the non-normal time continues a predetermined number of times, the controller 2 sends stop commands respectively to the material dryer 5 and the material conveyor 6. The material conveyor 6 receiving the stop command stops the material conveyance. The material dryer 5 receiving the stop command stops the operation.

When the received detection data is within the normal range in the detection data receiving step S16B for receiving the detection data, subsequently to the detection data judging step S17, the controller 2 proceeds to a molding stop judging step S19. On the other hand, when the received detection data is outside the normal range in the detection data receiving step S16B for receiving the detection data, subsequently to the command sending step S18, the controller 2 proceeds to the molding stop judging step S19.

When the number of molded normal products has not reached a set value and when a molding stop signal from the molding machine 8 is absent in the molding stop judging step S19, the molding machine 8 repeats a molding cycle a predetermined number of times and continuously produces molded products. On the other hand, when the number of molded normal products has reached the set value, when the molding stop signal from the molding machine 8 is received, or when the release operation in the release place at the abnormal time or the non-normal time continues a predetermined number of times in the molding stop judging step S19, the controller 2 proceeds to a peripheral equipment stop step S20.

In the peripheral equipment stop step S20, the controller 2 sends a peripheral equipment stop command to the take-out robot 3, the material dryer 5, the material conveyor 6, and the temperature controller 7. The take-out robot 3, the material dryer 5, the material conveyor 6, and the temperature controller 7 receiving the peripheral equipment stop command perform a purge operation or an end operation and change to a standby state or a stop state. The material dryer 5 receiving the stop command from the controller 2 in the command sending step S18 stops the operation and the material conveyor 6 receiving the stop command stops the material conveyance. At this time, the take-out robot 3 changes to an automatic operation stop state after the molding cycle ends. At this time, the temperature controller 7 continues the operation until a fixed time from the molding cycle end and thereafter stops the operation.

According to this embodiment, since the control system of the respective kinds of peripheral equipment is unitarily managed by the control of the controller 2, it is possible to control, without applying a load to the molding machine 8, based on detection data from the respective kinds of peripheral equipment such as the material dryer 5 and the temperature controller 7, an operation of the take-out robot 3 for releases a molded product in the release place at the normal time or the standard time and an operation of the take-out robot 3 for releases the molded product in the release place different from the release place at the normal time or the standard time. That is, since the take-out robot 3 performs a plurality of kinds of operations according to the command and timely judges a release place of the molded product, the controller 2 can perform reasonable classification control for the molded product. The take-out robot 3 performs a release operation for releases the molded product in the release place different from the release place at the standard time according to the command from the controller 2. Further, the material dryer 5 stops the material conveyance of the material to the material conveyor 6 according to the command from the controller 2. Therefore, it is possible to prevent occurrence of a quality failure such as insufficient drying of the material. Accordingly, the quality of the molded product is further raising.

According to this embodiment, it is possible to monitor, with the controller 2, operations of the network-connected respective kinds of peripheral equipment, accumulate data, and utilize the data for quality improvement of the molded product. It is possible to monitor operation information of the molding machine 8 with the controller 2 and associate the respective kinds of peripheral equipment according to operation timing of the molding machine 8. As an example, it is possible to timely notify information to the operator by sending error information and a production state of the take-out robot 3 to a portable information terminal such as a smartphone. Further, by implementing a function of Artificial Intelligence including a computer program in the controller 2, it is also possible to optimize operation condition information of the respective kinds of peripheral equipment while timely updating the database 22.

Figure 4:
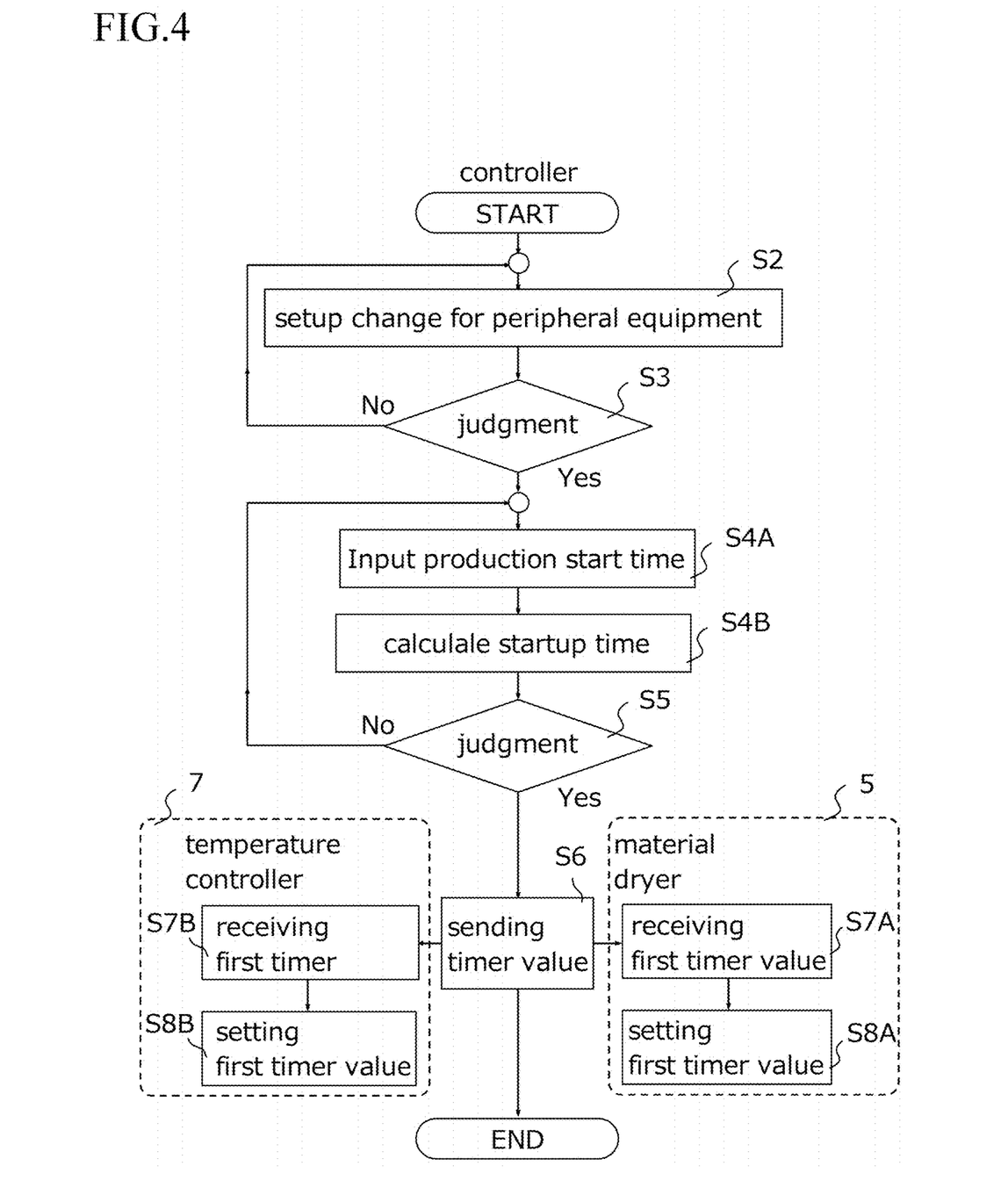
FIG. 4 is a flowchart showing an example of the operation procedure of the controller according to the embodiment.

FIG. 4 is an example of the operation procedure of the controller 2 according to this embodiment and is a flowchart including judgment of effectiveness of peripheral equipment. Subsequently, the operation procedure of the controller 2 is described below.

As an example, after the condition setting for the respective kinds of peripheral devices by the controller 2, in a peripheral equipment setup change step S2, the operator sets the effector 32 in the take-out robot 3. When the effector 32 is set, the controller 2 moves the arm part 31 of the take-out robot 3 to a take-out origin position, and proceeds to a peripheral equipment effectiveness judging step S3.

In the peripheral equipment effectiveness judging step S3, the controller 2 reads out each data linked with a mold number stored in the database 22 and collates an effector signal from the effector 32 set in the take-out robot 3 and mold data of the mold 81 set in the molding machine 8. When collating the effector signal and the mold data and judging that a collation result indicates that the effector signal and the mold data coincide, the controller 2 proceeds to a production start time input step S4A. On the other hand, when collating the effector signal and the mold data and judging that the collation result indicates that the effector signal and the mold data do not coincide, the controller 2 returns to a state immediately before the setup change step S2. The controller 2 displays an error on the input/output section 24 to notify the error to the operator. With this configuration, since the controller 2 proceeds to the production start time input step S4A only when a combination of the mold 81 and the effector 32 is correct, it is possible to prevent a human error and it is possible to make it easy to more safely and surely perform startup control.

Subsequently to the peripheral equipment effectiveness judging step S3, the controller 2 proceeds to the production start time input step S4A. In the production start time input step S4A, the operator inputs production start time of the molding machine 8 to the input/output section 24. Consequently, the controller 2 proceeds from the production start time input step S4A to a startup time calculating step S4B. In the startup time calculating step S4B, the controller 2 subtracts both of a material temperature rise time and a material preliminary drying time in the material dryer 5 from the production start time of the molding machine 8 and calculates a first timer value with which the material dryer 5 starts. The controller 2 subtracts both of a mold temperature rise time and a mold preliminary heating time in the temperature controller 7 from the production start time of the molding machine 8 and calculates a second timer value with which the temperature controller 7 starts.

Subsequently to the startup time calculating step S4B, the controller 2 proceeds to a startup time effectiveness judging step S5. In the startup time effectiveness judging step S5, when a value obtained by subtracting present time indicated by the reference timer 27 when the operator selects or inputs the mold number of the mold 81 displayed on the input/output section 24 from the production start time of the molding machine 8 is larger than both of the calculated first timer value and the calculated second timer value, the controller 2 judges that a result of the calculation is effective and proceeds to a peripheral equipment-destined timer value sending step S6. On the other hand, when the value obtained by subtracting the present time indicated by the reference timer 27 when the operator selects or inputs the mold number of the mold 81 displayed on the input/output section 24 from the production start time of the molding machine 8 is the same as or smaller than the calculated first timer value or the calculated second timer value, the controller 2 judges that the calculation result is not effective. When judging that the calculation result is not effective, the controller 2 returns to a state immediately before the production start time input step S4A. The controller 2 displays an error on the input/output section 24 to notify the error to the operator. With this configuration, the controller 2 proceeds to the steps for respectively starting the material dryer 5 and the temperature controller 7 only when there is no contradiction in the setting of the first timer value and the second timer value. Therefore, it is possible to prevent a human error and it is possible to make it easy to more safely and surely perform the startup control.

In the peripheral equipment-destined timer value sending step S6, the controller 2 sends the first timer value to the material dryer 5 and sends the second timer value to the temperature controller 7. In step S7A, the material dryer 5 receives the first timer value. In step S8A, the material dryer 5 sets a first timer 57 to the first timer value. In step S7B, the temperature controller 7 receives the second timer value. In step S8B, the temperature controller 7 sets a second timer 77 to the second timer value. According to this embodiment, the molded product take-out apparatus 1 has a configuration that can prevent a human error while enabling more efficient startup control for the peripheral equipment. Note that the molded product take-out apparatus 1 sometimes performs a change as appropriate according to specifications.

Figure 5:
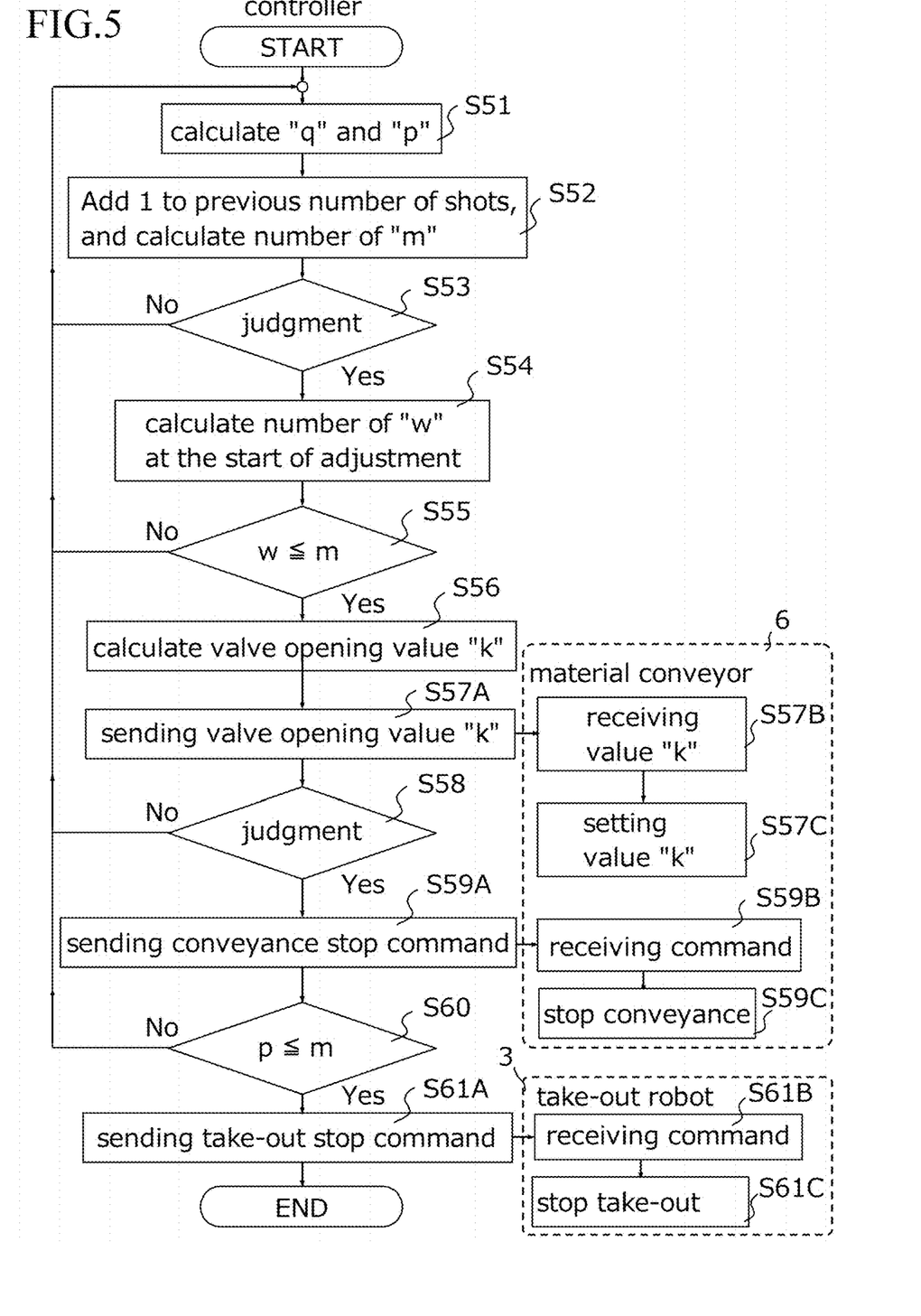
FIG. 5 is a flowchart showing an example of the operation procedure of the controller according to the embodiment.
Figure 6:
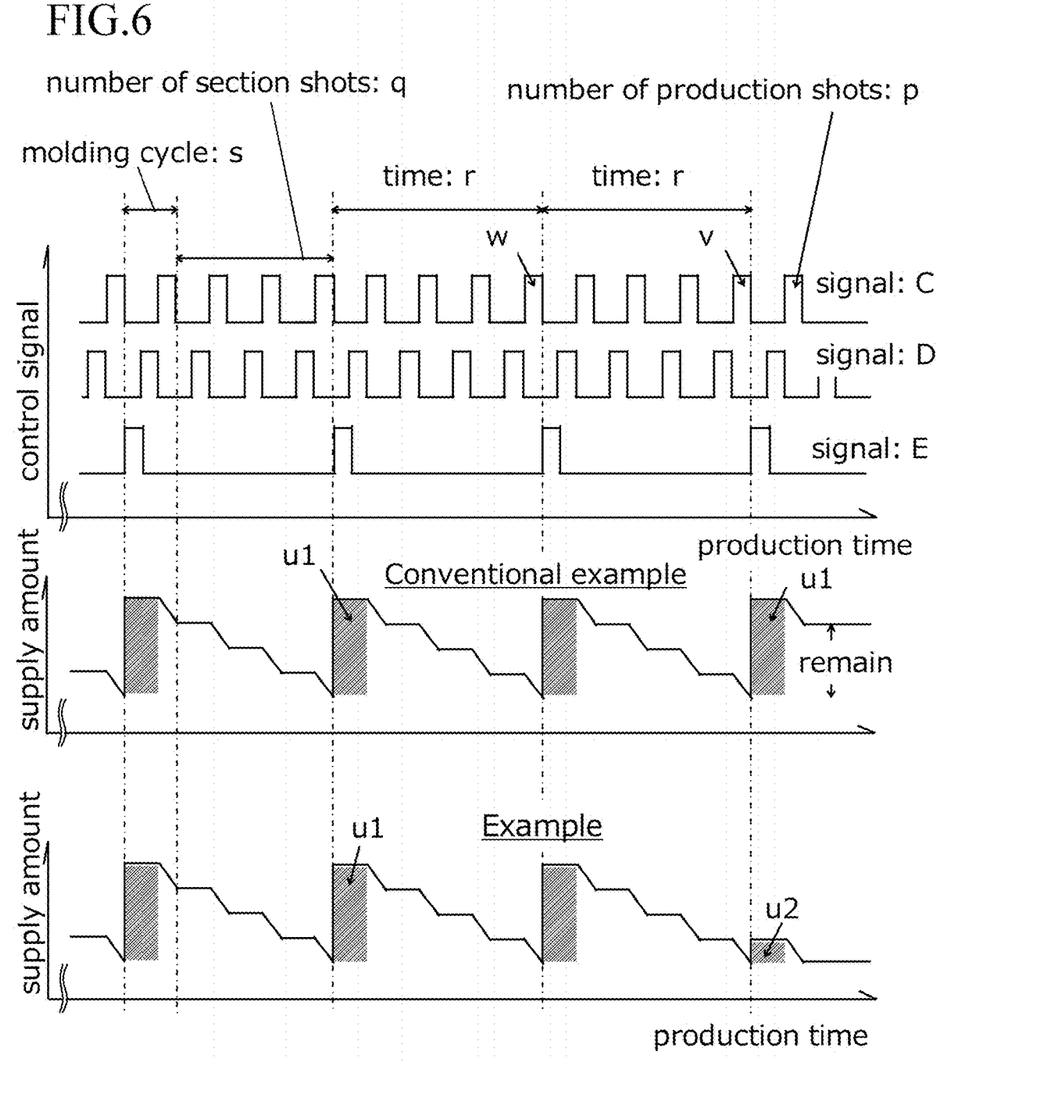
FIG. 6 is a timing chart showing a relation between a control signal and a material supply amount according to the embodiment in comparison between a conventional example and an example.

FIG. 5 is an example of an operation procedure of the controller 2 according to this embodiment and is a flowchart including judgment of effectiveness of the number of section shots q. FIG. 6 is a timing chart showing a relation between a control signal and a material supply amount according to this embodiment in comparison between a conventional example and an example. Subsequently, the operation procedure of the controller 2 is described below.

As an example, in step S51, the controller 2 divides the material supply interval time "r" by the molding cycle s to calculate the number of section shots "q" in every material supply interval time r or counts the number of shots in a material supply interval to calculate the number of section shots "q (q=r/s)" and calculates, during a production period in the molding machine 8, the number of production shots "p" with which the molding machine 8 reaches a planned number of productions.

Subsequently, in step S52, the controller 2 adds 1 to the previous number of normal product shots at the time of molded product take-out of the take-out robot 3 to calculate the number of cumulative shots m at the present time. The controller 2 proceeds to step S53 for confirming that the material conveyor 6 has conveyed the material to the molding machine 8 and judging effectiveness of the calculated number of section shots "q".

When judging in step S53 that the number of section shots "q" is effective, the controller 2 proceeds to step S4. On the other hand, when judging that the number of section shots q is not effective, the controller 2 returns to step S51. As an example, the controller 2 calculates the number of section shots q again and, when the number of section shots "q" coincides with a value of the number of section shots calculated last time, the controller 2 judges that the number of section shots "q" is effective and causes a memory or the database 22 to store a measurement value.

When judging that the number of section shots q is effective, the controller 2 proceeds to step S54. In step S54, the controller 2 calculates the number of shots at the start of adjustment w obtained by subtracting the number of section shots q and further subtracting 1 from the number of production shots "p(w=p−q−1)" and proceeds to step S55.

In step S55, the controller 2 judges whether the number of cumulative shots "m" at the present time has reached the number of shots at the start of adjustment "w". When judging that the number of cumulative shots "m" has reached the number of shots at the start of adjustment "w", the controller 2 proceeds to step S56. On the other hand, when judging that the number of cumulative shots "m" has not reached the number of shots at the start of adjustment "w", the controller 2 returns to step S51.

When judging that the number of cumulative shots "m" has reached the number of shots at the start of adjustment "w", the controller 2 proceeds to step S56. In step S56, the controller 2 calculates the valve opening time value "k" for supplying the remaining shots in the molding machine 8 and proceeds to step S57A. In step S57A, the controller 2 sends the valve opening time value "k" to the material conveyor 6. In step S57B, the material conveyor 6 receives the valve opening time value "k" sent from the controller 2 and proceeds to step S57C. In step S57C, the material conveyor 6 sets the valve opening time value "k" for supplying the remaining shots.

The controller 2 proceeds from step S57A to step S58. In step S58, the controller 2 judges whether a material is conveyed. When judging that the material is conveyed, the controller 2 proceeds to step S59A. On the other hand, when judging that the material is not conveyed, the controller 2 returns to step S51.

When judging that the material is conveyed, the controller 2 proceeds to step S59A. In step S59A, the controller 2 sends a conveyance stop command to the material conveyor 6. In step S59B, the material conveyor 6 receives the conveyance stop command from the controller 2 and proceeds to step S59C. In step S59C, the material conveyor 6 stops the conveyance of the material.

After sending the conveyance stop command, the controller 2 proceeds to step S60. In step S60, the controller 2 judges whether the number of cumulative shots "m" has reached the number of production shots "p". When judging that the number of cumulative shots "m" has reached the number of production shots "p", the controller 2 proceeds to step S61A. On the other hand, when judging that the number of cumulative shots "m" has not reached the number of production shots "p", the controller 2 returns to step S51.

When judging that the number of cumulative shots "m" has reached the number of production shots "p", the controller 2 proceeds to step S61A. In step S61A, the controller 2 sends a take-out stop command to the take-out robot 3. In step S61B, the take-out robot 3 receives the take-out stop command from the controller 2 and proceeds to step S61C. In step S61C, the take-out robot 3 stops the take-out of the molded product.

In addition to the above, the controller 2 performs control for, when the cumulative time "t3" based on the number of cumulative shots "m" reaches the material supply end time "t2" obtained by subtracting the preliminary drying time from the production end time t1 based on the number of production shots "p", sending, to the material conveyor 6, a stop command for conveyance of the material before drying to the material dryer 5 and stopping the conveyance of the material before drying from the material conveyor 6 to the material dryer 5. As an example, the production end time "t1" is a value obtained by multiplying, by the molding cycle "s", a number obtained by subtracting the number of normal product shots from the number of production shots "p". When the material supply end time "t2" reaches the production end time "t1", the controller 2 stops the conveyance of the material before drying from the material conveyor 6 to the material dryer 5.

In FIG. 3, the material supply amount is indicated by hatching. In the conventional example, since the dried material supply amount "u1" supplied to the hopper of the molding machine 8 per one time and the dried material supply amount supplied last are the same amount, a remaining amount of the material occurs in the hopper after the production end. In contrast, in the example, since the dried material supply amount u2 supplied last is adjusted to a small amount with respect to the dried material supply amount u1 supplied to the hopper of the molding machine 8 per one time, it is possible to minimize a remaining amount of the material in the hopper after the production end.

According to this embodiment, the controller 2 can prevent excess material drying for production by predicting production end time and the number of shots until the production end while checking the number of molded products other than the number of normal products according to the number of ended productions, drying only the material by an amount necessary for the production, and reducing a conveyance amount of the dried material from a conveyance amount before a production end final shot and can prevent a material loss and reduce a setup time by minimizing a remaining amount of the dried material in the hopper in the molding machine 8 after the production end. That is, it is possible to perform, based on a calculation result in the controller 2, reasonable control of an operation that associates the material dryer 5 and the material conveyor 6. The production ending operations of the take-out robot 3 and the material conveyor 6 can be respectively timely controlled and power saving is achieved. Therefore, the molded product take-out apparatus 1 has a configuration that can prevent a human error while enabling more efficient production end control for the peripheral equipment. Note that a specification change for the molded product take-out apparatus 1 described above is performed as appropriate according to specifications in some cases.

The present invention is not limited to the embodiment described above. Changes are possible in a range not departing from the present invention.

What is claimed is:

1. A molded product take-out apparatus for a molding machine with a mold for molding a resin material, the molded product take-out apparatus comprising:

a material dryer for drying the resin material by air, a material conveyer for conveying the resin material dried by the material dryer to a hopper of the molding machine, a temperature-controller for controlling a temperature of the mold, a take-out robot for taking out a product molded by the mold of the molding machine, and a controller, the material dryer having a temperature sensor for sensing a temperature of the air, wherein the material dryer, the material conveyer, the temperature-controller, and the take-out robot are network-connected to the controller, the controller is electrically connected to the molding machine, and the molding machine is configured to send a mold opening limit signal to the controller, wherein the controller is configured such that when the controller receives the mold opening limit signal from the molding machine, the controller sends a request for temperature data sensed by the temperature sensor to the material dryer, so that the material dryer sends the temperature data to the controller, wherein when the controller receives the temperature data from the material dryer, the controller is configured to judge whether the temperature data received from the material dryer is within a predetermined allowable range therefor, wherein when the controller judges that the temperature data is within the allowable range, the controller is configured to send a request to the take-out robot to take out a molded product molded in the mold and place the molded product to a release place, and wherein when the controller judges that the temperature data is outside the allowable range, the controller is configured to send a request to the take-out robot to place the molded product to a place different from the release place.

2. A molded product take-out apparatus for a molding machine with a mold for molding a resin material, the molded product take-out apparatus comprising:

a material dryer for drying the resin material, a material conveyer for conveying the resin material dried by the material dryer to a hopper of the molding machine, a temperature-controller for controlling a temperature of the mold of the molding machine by controlling a temperature of a medium passing through an inside of the mold a take-out robot for taking out a product molded by the mold of the molding machine, and a controller, the temperature-controller having a temperature sensor for sensing the temperature of the medium, wherein the material dryer, the material conveyer, the temperature-controller, and the take-out robot are network-connected to the controller, the controller is connected to the molding machine, and the molding machine is configured to send a mold opening limit signal to the controller, wherein the controller is configured such that when the controller receives the mold opening limit signal from the molding machine, the controller sends a request for temperature data sensed by the temperature sensor to the temperature-controller, so that the temperature-controller sends the temperature data to the controller, wherein when the controller receives the temperature data from the temperature-controller, the controller is configured to judge whether the temperature data received from the temperature-controller is within a predetermined allowable range therefor, wherein when the controller judges that the temperature data is within the allowable range, the controller is configured to send a-first request to the take-out robot to take out a molded product molded in the mold and place the molded product to a release place, and wherein when the controller judges that the temperature data is outside the allowable range, the controller sends a request to the take-out robot to place the molded product to a place different from the release place.

* * * * *